United States Patent Office 3,714,173
Patented Jan. 30, 1973

3,714,173
PYRIDYL KETIPATE LACTONES
AND DERIVATIVES
Blaine M. Sutton, Hatboro, Pa., assignor to Smith Kline
& French Laboratories, Philadelphia, Pa.
No Drawing. Filed July 6, 1971, Ser. No. 160,190
Int. Cl. C07d 31/36
U.S. Cl. 260—295 R       7 Claims

ABSTRACT OF THE DISCLOSURE

Pyridyl ketipate lactones and derivatives having anti-arthritic activity prepared by alcoholysis of an appropriate pyridyl substituted dilactone.

---

This invention relates to novel lactones of ketipic acid and derivatives having valuable pharmacodynamic activity. More specifically these compounds possess anti-arthritic activity and at anti-arthritic doses they produce analgesic and antipyretic activity.

The compounds of this invention are represented by the following general structural formula:

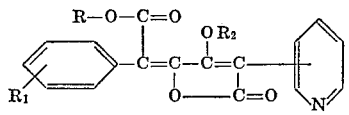

FORMULA I wherein:

R represents methyl or ethyl;
$R_1$ represents hydrogen, chlorine, bromine, fluorine, methyl, methoxy, ethoxy, dimethoxy, trimethoxy or trifluoromethyl;
$R_2$ represents hydrogen, acrylyl, methacrylyl, dimethylacrylyl, crotonyl or cinnamoyl.

Preferably the compositions of this invention comprise a compound of Formula I above when R is methyl, $R_1$ is hydrogen, chlorine, bromine, methyl, methoxy or trifluoromethyl, and $R_2$ represents hydrogen, acrylyl or cinnamoyl. Most advantageously R is methyl, $R_1$ is hydrogen, chlorine, fluorine or trifluoromethyl, and $R_2$ is hydrogen.

The novel ketipate lactones and derivatives are prepared according to the following synthetic procedure.

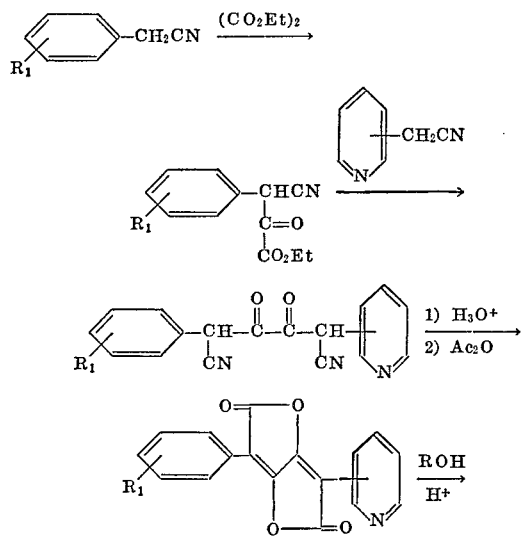

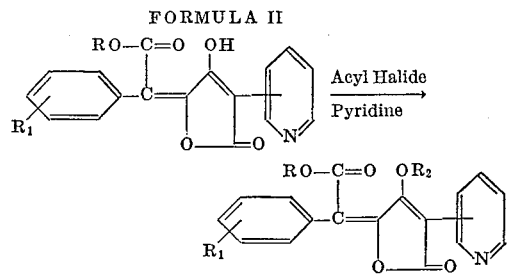

in which R, $R_1$ and $R_2$ are as defined above from Formula I. Thus a phenylacetonitrile is condensed with ethyl oxalate in an alcoholic solution of an alkali metal lower alkoxide, such as sodium methoxide or ethoxide to give the ethyl 3-cyano-3-phenylpyruvate. This compound is further condensed with a pyridylacetonitrile in an alcoholic soltuion of an alkali metal lower alkoxide, such as sodium methoxide or ethoxide to yield the 2-phenyl-5-pyridyl-3,4-dioxcadiponitrile. The above condensations may also be carried out using a metal hydride, such as sodium hydride, in diglyme. The adiponitrile derivative is refluxed for a short period of time, for example, one or two hours, in an aqueous acid solution such as water/glacial acetic acid/concentrated sulfuric acid mixture and the resulting ketipic acid is refluxed with acetic anhydride to furnish the corresponding ketipic acid lactone of Formula II above. The dilactone is ring opened to the products of Formula I by brief refluxing in the appropriate alkanol, containing a mineral acid such as hydrochloric acid. The acid derivative is then heated with the appropriate acyl halide, preferably acyl chloride, to yield the desired unsaturated acyl esters. The reaction is advantageously carried out in a nonreactive organic solvent such as chloroform in the presence of pyridine.

The anti-arthritic activity of the compounds of this invention is measured by their ability to inhibit adjuvant arthritis in rats. The novel compounds of this invention produce marked inhibition of the development of adjuvant arthritis in rats at a daily oral dose of 25 mg. per kilogram of body weight. Adjuvant arthritis in rats is produced by a single injection of 0.75 mg. of Mycobacterium butyricum suspended in white paraffin (N.F.) into a hind-paw (left footpad). The injected paw becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days thereafter, exclusive of days 4, 5, 11 and 12, protect the animals against development of both primary and secondary lesions of adjuvant arthritis.

The compounds of this invention may be administered orally or parenterally in conventional dosage unit forms such as tablets, capsules, injectables or the like, by incorporating the appropriate dose of a compound of Formula I, with carriers according to accepted pharmaceutical practices. Preferably the compound is administered orally to animal organism in a tablet or capsule comprising an amount sufficient to produce anti-arthritic activity. Each dosage unit will contain the active medicament in an amount of about 10 mg. to about 50 mg. Advantageously equal doses will be administered 1 to 3 times daily with the daily dosage regimen being about 10 mg. to about 150 mg.

The pharmaceutical carrier employed may be, for example, either a solid or liquid. Examplary of solid carriers are lactose, terra alba, sucrose, talc, gelatin, agar, pectin, acacia, magnesium stearate, stearic acid and the like. Examplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

The following examples are not limiting but are illustrative of compounds of this invention and the procedures for their preparation. Other variations of this invention will be obvious to those skilled in the art.

EXAMPLE I

A mixture of 117.1 g. (1.0 ml.) of phenylacetonitrile and 326 ml. (2.4 m.) of ethyl oxalate is added to an ethanol solution of sodium ethoxide (prepared by dissolving 23.8 g., 1.08 g. atom of sodium in 500 ml. of absolute ethanol) and refluxed two hours. After cooling, diluting with 2500 ml. of water and extracting with ether, the solution is acidified with acetic acid. The solid is removed and washed with water to give ethyl 3-cyano-3-phenylpyruvate, M.P. 127–129° C.

To a solution of 8.3 g. (0.07 m.) of 3-pyridylacetonitrile and 20 ml. of diglyme is added 10.0 g. of sodium hydride. Ethyl 3-cyano-3-phenylpyruvate 15.2 g. (0.07 m.) is added in portions at −10° C. and the reaction mixture is stirred at room temperature overnight. The mixture is diluted with 500 ml. of water, extracted with ether, acidified with acetic acid, and filtered to yield 2-phenyl-5-(3'-pyridyl)-3,4-dioxoadiponitrile.

A mixture of 14.0 g. (0.0484 m.) of 2-phenyl-5-(3'-pyridyl-3,4-dioxoadiponitrile in 95 ml. of water, 140 ml. of glacial acetic acid and 70 ml. of concentrated sulfuric acid is refluxed for one hour. The suspension is cooled, poured onto 500 ml. of ice water and the solid removed and washed to give 2-phenyl-5-(3'-pyridyl) ketipic acid lactone 3,6.

2-phenyl-5-(3'-pyridyl) ketipic acid lactone 3,6 5.0 g. (0.016 m.) is refluxed in 60 ml. of acetic anhydride for 15 minutes. The cooled solution is poured into 300 ml. of methanol and 100 ml. of ice. The separated solid is dissolved in 100 ml. of methanol containing 5 g. of potassium hydroxide. The solution is acidified and diluted with water to yield methyl 2-phenyl-5-(3'-pyridyl)ketipate lactone 3,6, M.P. 245–245.5° C.

EXAMPLE 2

Acrylyl chloride, 5 ml., is added to a solution of 3.23 g. (.01 m.) of methyl 2-phenyl-5-(3'-pyridyl) ketipate lactone 3,6 (as prepared in Example 1) in 25 ml. of chloroform containing 2 ml. of pyridine and refluxed for five minutes. The reaction mixture is then concentrated, washed and recrystallized to yield the 4-acryl ester of methyl 2-phenyl-5-(3'-pyridyl) ketipate lactone 3,6.

EXAMPLE 3

Methacrylyl chloride 10 ml. is added to a solution of 6.46 g. of methyl 2-phenyl-5-(3'-pyridyl) ketipate lactone 3,6 (as prepared in Example 1) in 50 ml. of chloroform containing 2 ml. of pyridine and refluxed for five minutes. The reaction mixture is then concentrated, washed and recrystallized to yield the 4-methacrylyl ester of methyl 2-phenyl-5-(3'-pyridyl) ketipate lactone 3,6.

EXAMPLE 4

A solution containing 16.6 g. of cinnamoyl chloride, 3.26 g. of methyl 2-phenyl-5-(3'-pyridyl) ketipate lactone 3,6 (as prepared in Example 1) and 25 ml. of chloroform containing 1 ml. of pyridine is refluxed for five minutes. The reaction mixture is concentrated, washed and recrystallized to yield the 4-cinnamoyl ester of methyl 2-phenyl-5-(3'-pyridyl) ketipate lactone 3,6.

EXAMPLE 5

A mixture of 45.3 g. (0.31 m.) of p-chlorophenylacetonitrile and 107 g. (0.72 m., 99 ml.) of diethyl oxalate in an alcoholic sodium ethylate solution (prepared by dissolving 7.13 g. [0.31 g. atom] of sodium in 120 ml. of absolute ethanol) is refluxed with stirring for two hours. The cooled reaction mixture is diluted with 700 ml. of water, acidified with acetic acid and cooled to ice bath temperature. The resulting solid is recrystallized from aqueous methanol to give ethyl 3-cyano-3-(p-chlorophenyl)-pyruvate, M.P. 134–135° C.

Ethyl 3-cyano-3-(p-chlorophenyl)-pyruvate (40 g., 0.16 m.) and 3-pyridylacetonitrile 39.0 g. (0.33 m.) are added to an alcoholic solution of sodium ethylate (prepared from 7.36 g. [0.32 g. atom] of sodium and 190 ml. of absolute ethanol) and the resulting solution is refluxed for two hours. The reaction mixture is diluted with water, acidified with acetic acid and cooled to ice bath temperature to yield 2-(p-chlorophenyl)-5-(3'-pyridyl)-3,4-dioxoadiponitrile.

A solution of 14.6 g. (.04 m.) of 2-(p-chlorophenyl)-5-(3'-pyridyl)-3,4-dioxoadiponitrile in a mixture of 150 ml. of water, 210 ml. of acetic acid and 105 ml. of concentrated sulfuric acid is stirred and refluxed for two hours. The reaction mixture is diluted with 500 ml. of water and cooled to ice bath temperature to yield 2-(p-chlorophenyl)-5-(3'-pyridyl) ketipic acid lactone (3,6).

3.67 g. (.01 m.) of 2-(p-chlorophenyl)-5-(3'-pyridyl) ketipic acid lactone 3,6 is refluxed in 60 ml. of acetic anhydride for 30 minutes and cooled. The mixture is poured into 300 ml. of methanol and 100 ml. of ice. The separated solid is dissolved in 100 ml. of methanol containing 5 g. of potassium hydroxide. The solution is acidified and diluted with water to yield methyl 2-(p-chlorophenyl)-5-(3'-pyridyl) ketipate lactone, 3,6.

EXAMPLE 6

Similarly be reacting 2-pyridylacetonitrile with ethyl 3-cyano-3-phenylpyruvate and following the subsequent synthetic steps as described in Example 1, there is prepared the product methyl 2-phenyl-5-(2-pyridyl) ketipate lactone, 3,6.

EXAMPLE 7

10.0 g. of 2-phenyl-5-(3'-pyridyl) ketipic acid lactone 3,6 (as prepared in Example 1) is refluxed in 120 ml. of acetic anhydride for 25 minutes. The cooled solution is poured into 500 ml. of ethanol and 700 ml. of ice. The separated solid is dissolved in 200 ml. of ethanol containing 8 g. of potassium hydroxide. The solution is acidified and diluted with water to yield ethyl 2-phenyl-5-(3'-pyridyl) ketipate lactone 3,6.

EXAMPLE 8

By employing the procedures set forth in Example 1, p-trifluoromethylphenylacetonitrile is reacted with diethyl oxalate in alcoholic sodium ethoxide to give ethyl 3-cyano-3-(p-trifluoromethylphenyl) pyruvate. Reaction of the latter under similar conditions with 3-pyridylacetonitrile results in 2-(3'-pyridyl)-5-(p-trifluoromethylphenyl)-3,4-dioxoadiponitrile.

The adiponitrile is refluxed in water, acetic acid and concentrated sulfuric acid to yield 5-(3'-pyridyl)-2-(p-trifluoromethylphenyl) ketipic acid lactone 3,6. The lactone is refluxed with acetic anhydride, cooled and dissolved in a methanol-potassium hydroxide solution to yield methyl 5-(3′-pyridyl)-2-trifluoromethylphenyl ketipic acid lactone 3,6.

EXAMPLE 9

| Ingredients: | Mg./tablet |
|---|---|
| Methyl 2-phenyl-5-(3′-pyridyl) ketipic acid lactone 3,6 | 25 |
| Calcium sulfate, dihydrate | 150 |
| Sucrose | 25 |
| Starch | 15 |
| Talc | 5 |
| Stearic acid | 3 |

The sucrose, calcium sulfate and methyl 2-phenyl-5-(3′-pyridyl ketipic acid lactone 3,6 are thoroughly mixed and granulated with hot 10% gelatin solution. The wetted mass is passed through a #6 mesh screen directly onto drying trays. The granules are dried at 120° C. and passed through a #20 mesh screen, mixed with the starch, talc and stearic acid, and compressed into tablets.

EXAMPLE 10

| Ingredients: | Mg./capsule |
|---|---|
| Ethyl 2-phenyl-5-(2-pyridyl) ketipic acid lactone 3,6 | 50 |
| Magnesium stearate | 5 |
| Lactose | 350 |

The above ingredients are screened through a #40 mesh screen, mixed and filled into #0 hard gelatin capsules.

What is claimed is:

1. A chemical compound of the formula:

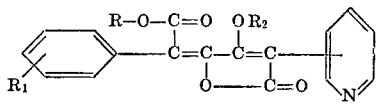

wherein:

R is methyl or ethyl;

$R_1$ is hydrogen, chlorine, bromine, fluorine, methyl, methoxy, ethoxy dimethoxy, trimethoxy or trifluoromethyl; and $R_2$ is hydrogen.

2. A chemical compound according to claim 1 in which R is methyl.

3. A chemical compound according to claim 1 in which R is ethyl.

4. A chemical compound according to claim 2 in which $R_1$ and $R_2$ are hydrogen.

5. A chemical compound according to claim 4 in which the pyridyl nucleus is substituted at the 3 position.

6. A chemical compound according to claim 4 in which the pyridyl nucleus is substituted at the 2 position.

7. A chemical compound according to claim 2 in which $R_1$ is chlorine and $R_2$ is hydrogen.

References Cited

UNITED STATES PATENTS

| 3,321,484 | 5/1967 | Krimmel | 260—295.5 R |
| 3,373,169 | 3/1968 | Cherdron et al. | 260—343.9 |
| 3,380,939 | 4/1968 | Palm et al. | 260—9 |

ALAN L. ROTMAN, Primary Examiner

U.S. Cl. X.R.

260—240 J, 294.9, 295.5 R, 465 D; 624—266